US008609581B2

(12) United States Patent
Miyairi (10) Patent No.: US 8,609,581 B2
(45) Date of Patent: Dec. 17, 2013

(54) HONEYCOMB STRUCTURE AND HONEYCOMB CATALYTIC BODY (75) Inventor: Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 744 days.

(21) Appl. No.: 11/511,457

(22) Filed: Aug. 29, 2006

(65) Prior Publication Data
US 2007/0054803 A1 Mar. 8, 2007

(30) Foreign Application Priority Data

Aug. 31, 2005 (JP) ................. 2005-250874

(51) Int. Cl.
C01B 31/08 (2006.01)
B01D 50/00 (2006.01)
B01D 53/34 (2006.01)

(52) U.S. Cl.
USPC ............ 502/423; 422/180; 422/177; 422/171

(58) Field of Classification Search
None
See application file for complete search history.

(56) References Cited

U.S. PATENT DOCUMENTS

| 4,455,336 | A  | * | 6/1984  | Ogawa et al.    | 428/116 |
| 5,089,237 | A  | * | 2/1992  | Schuster et al. | 422/180 |
| 5,895,700 | A  | * | 4/1999  | Yamada et al.   | 428/116 |
| 6,818,580 | B2 | * | 11/2004 | Kumazawa et al. | 501/119 |
| 7,344,770 | B2 | * | 3/2008  | Hirai et al.    | 428/116 |
| 2004/0033175 | A1 |   | 2/2004  | Ohno et al.    |         |
| 2004/0177600 | A1 |   | 9/2004  | Ichikawa et al. |        |
| 2005/0272602 | A1 | * | 12/2005 | Ninomiya       | 502/439 |

FOREIGN PATENT DOCUMENTS

| JP | A 2003-033664 | 2/2003 |
| JP | A 2003-210922 | 7/2003 |
| JP | A 2004-162544 | 6/2004 |
| JP | A 2004-232530 | 8/2004 |
| JP | A 2004-270569 | 9/2004 |
| WO | WO 02/26351 A1 | 4/2002 |

OTHER PUBLICATIONS

Dec. 23, 2011 extended European Search Report in European Patent Application No. 067 97 146.5.

* cited by examiner

Primary Examiner — Emily Le
Assistant Examiner — Michael Forrest
(74) Attorney, Agent, or Firm — Oliff & Berridge, PLC (57) ABSTRACT A honeycomb structure includes: porous partition walls having a large number of pores and disposed to form a plurality of cells communicating between two end faces, and plugged portions disposed to plug each of the cells on one of the end faces. A percentage of the number of carbon particulates contained in combustion exhaust gas satisfying the following condition (1) and passing through a honeycomb structure is 80% or more at a space velocity of 25000/h. The condition (1) is that the carbon particulates has a mean diameter of 0.07 to 0.2 μm, a ratio of the carbon particulates having a diameter of 1 μm or more is 0.1% or less in number and that a concentration of the carbon particulates is 10 mg/m$^3$. The honeycomb structure is excellent in purification efficiency, has low pressure loss, and is mountable even in a limited space.

10 Claims, 7 Drawing Sheets

HONEYCOMB STRUCTURE AND HONEYCOMB CATALYTIC BODY

BACKGROUND OF THE INVENTION AND RELATED ART STATEMENT

The present invention relates to a honeycomb structure suitably usable for purifying target components such as carbon monoxide (CO), hydrocarbonate (HC), nitrogen oxides ($NO_x$), and sulfur oxides ($SO_x$) contained in exhaust gas discharged from stationary engines for automobiles, construction machines, and industry and combustion apparatuses and to a honeycomb catalyst body.

Figure 4:
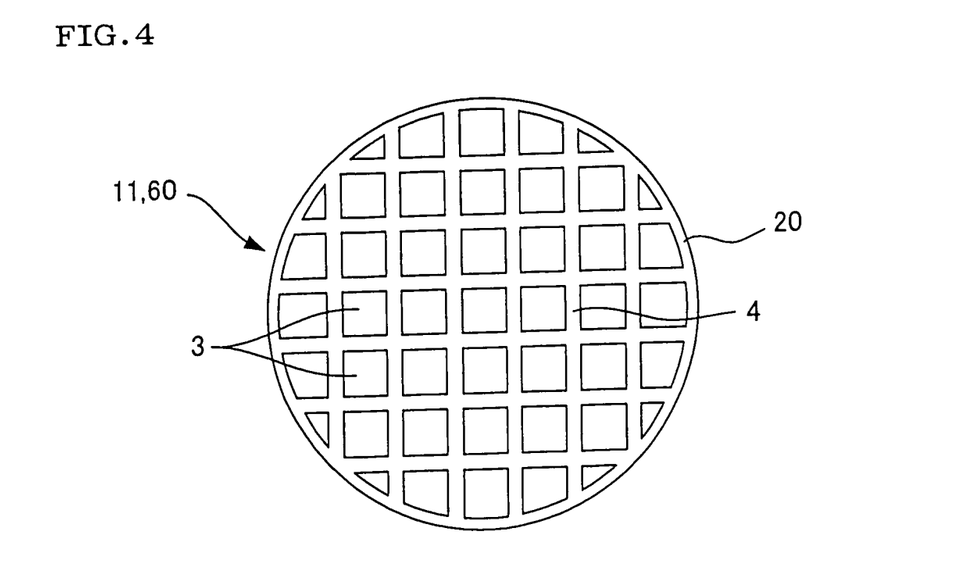
FIG. 4 is a front view schematically showing an embodiment of a conventional honeycomb structure and honeycomb catalyst body.
Figure 5:
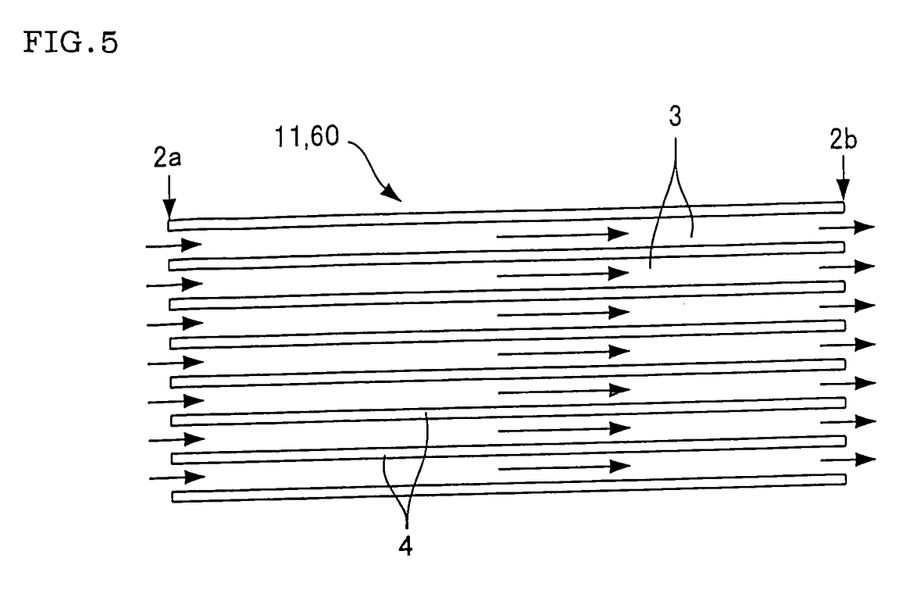
FIG. 5 is a cross-sectional view schematically showing an embodiment of a conventional honeycomb structure and honeycomb catalyst body.
Figure 6:
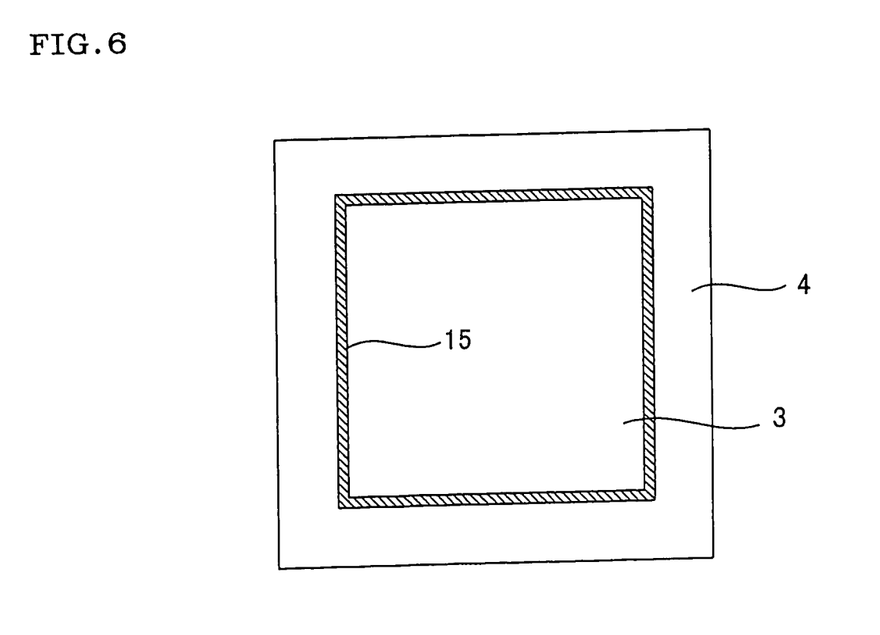
FIG. 6 is a partially enlarged view schematically showing an embodiment of a conventional honeycomb catalyst body.

At present, a honeycomb structured catalyst body (honeycomb catalyst body) is used for purifying exhaust gas discharged from various kinds of engines, or the like. As shown in FIG. 6, the honeycomb catalyst body has a structure where a catalyst layer 15 is loaded on a surface of partition walls 4 forming cells 3. In addition, as shown in FIGS. 4 and 5, when exhaust gas is purified by the use of the honeycomb catalyst body 60 (honeycomb structure 11), exhaust gas is allowed to flow into the cells 3 of the honeycomb catalyst body 60 from one end face 2a side to bring the exhaust gas into contact with the catalyst layer (not illustrated) on the surface of the partition walls 4, and then the exhaust gas is discharged outside from the other end face 2b (see JP-A-2003-33664).

In the case of purifying exhaust gas using such a honeycomb catalyst body, it is required to accelerate transmission of target components contained in exhaust gas from exhaust gas toward the catalyst layer on the surface of the partition walls as much as possible to enhance purification efficiency. In order to enhance purification efficiency, it is necessary to decrease a hydraulic diameter of the cells, to increase a surface area of the partition walls, and the like. Specifically, there is employed a method of increasing the cell number (cell density) per unit area, or the like.

Here, it is known that transmissibility of target components from exhaust gas toward the catalyst layer on the surface of the partition walls rises in inverse proportion to the square of a hydraulic diameter of the cells. Therefore, as the cell density is increased, the transmissibility of target components rises more. However, pressure loss also tends to increase in inverse proportion to the square of a hydraulic diameter of the cells. Therefore, there arises a problem that pressure loss rises in accordance with rise in transmissibility of target components.

Incidentally, the catalyst layer of the surface of the partition walls generally has a thickness of about several tens μm. Here, when the target components diffuse in the catalyst layer at an insufficient velocity, purification efficiency of the honeycomb catalyst body tends to be lowered. This tendency is particularly notable under low-temperature conditions. Therefore, in order to enhance exhaust gas purification efficiency, it is necessary to not only increase the surface area of the catalyst layer, but also reduce thickness of the catalyst layer to raise a diffusion velocity of the target components in the catalyst layer. Accordingly, when the cell density is increased, there arises a problem of increasing pressure loss though it has an advantage of increasing the surface area of the catalyst layer.

In order to reduce pressure loss together with enhancing exhaust gas purification efficiency, it is necessary to raise a flow rate of exhaust gas circulating in the honeycomb catalyst body together with increasing an inlet diameter of the honeycomb catalyst body. However, in the case that the honeycomb catalyst body is enlarged, it sometimes makes mounting difficult because of the limited mounting space regarding, for example, a honeycomb catalyst body to be mounted on a vehicle.

The present invention has been made in view of such problems of prior art and aims to provide a honeycomb structure capable of providing a honeycomb catalyst body excellent in purification efficiency, having low pressure loss, and mountable even in a limited space provide and a honeycomb catalyst body excellent in purification efficiency, having low pressure loss, and mountable even in a limited space.

In order to achieve the above aims, the present inventors zealously studied and, as a result, found out that the above aims can be achieved by specifying a percentage of the number of carbon particulates passing through a honeycomb structure under predetermined conditions, which led to the completion of the present invention.

SUMMARY OF THE INVENTION

That is, according to the present invention, there is provided the following honeycomb structure and honeycomb catalyst body.

A honeycomb structure comprising:
porous partition walls having a large number of pores and disposed to form a plurality of cells communicating between two end faces, and
plugged portions disposed to plug each of the cells on one of the end faces;
wherein a percentage of the number of carbon particulates contained in combustion exhaust gas satisfying the following condition (1) and passing through a honeycomb structure is 80% or more at a space velocity of 25000/h.

Condition (1): the carbon particulates has a mean diameter of 0.07 to 0.2 μm, a percentage of the carbon particulates having a diameter of 1 μm or more is 0.1% or less in number, and a concentration of the carbon particulates is 10 mg/m$^3$.

[2] A honeycomb structure according to the above [1], wherein an average image maximum distance of the partition walls is 43 μm or more, and the average image maximum distance of the cells in both end portions in the longitudinal direction is 80% or less of the average image maximum distance of the cells in a central portion in the longitudinal direction.

[3] A honeycomb structure according to the above [1], wherein an average image maximum distance of the partition walls is 43 μm or more, and the average image maximum distance of the cells in both end portions in the longitudinal direction is 60% or less of the average image maximum distance of the cells in a central portion in the longitudinal direction.

[4] A honeycomb structure according to any one of the above [1] to [3], wherein a ratio (L/D) of a length (L) of the cells in the direction of communication to the equivalent diameter (D) is 0.3 or more and less than 0.75.

[5] A honeycomb structure according to any one of the above [1] to [4], wherein a thickness of the partition walls is 0.3 to 0.43 mm, a cell density is 4 to 46.5 cells/cm$^2$, an average image maximum distance of the partition walls is 250 to 500 μm, and a porosity of the partition walls is 55 to 65%.

[6] A honeycomb structure according to the above [1] or [2], wherein an average image maximum distance of the partition walls is 250 to 3000 μm.

[7] A honeycomb catalyst body comprising:
a honeycomb structure according to any one of the above [1] to [6], and
a catalyst layer containing a catalyst and loaded at least on an inner surface of the pores of the partition walls of the honeycomb structure;
wherein a large number of pores carrying a catalyst layer are formed in the partition walls of the honeycomb structure, and a percentage of the number of carbon particulates contained in combustion exhaust gas satisfying the following condition (1) and passing through a honeycomb structure is 80% or more at a space velocity of 25000/h.

Condition (1): the carbon particulates has a mean diameter of 0.07 to 0.2 μm, a ratio of the carbon particulates having a diameter of 1 μm or more is 0.1% or less in number, and a concentration of the carbon particulates is 10 mg/m$^3$.

[8] A honeycomb catalyst body according to the above [7], wherein an average image maximum distance of the partition walls is 40 μm or more in a state that the catalyst layer is loaded, and the average image maximum distance of the cells in both end portions in the longitudinal direction is 80% or less of the average image maximum distance of the cells in a central portion in the longitudinal direction.

[9] A honeycomb catalyst body according to the above [7], wherein an average image maximum distance of the partition walls is 40 μm or more in a state that the catalyst layer is loaded, and the average image maximum distance of the cells in both end portions in the longitudinal direction is 60% or less of the average image maximum distance of the cells in a central portion in the longitudinal direction.

[10] A honeycomb catalyst body according to any one of the above [7] to [9], wherein a ratio (L/D) of a length (L) of the cells in the direction of communication to the equivalent diameter (d) is 0.3 or more and less than 0.75, a thickness of the partition walls is 0.3 to 0.43 mm, a cell density is 4 to 46.5 cells/cm$^2$, an average image maximum distance of the partition walls is 250 to 500 μm, a porosity of the partition walls is 60 to 80%, and a common logarithm standard deviation (pore diameter distribution σ) of pore diameter distribution in the partition walls is 0.2 to 0.6.

A honeycomb structure of the present invention is effective in providing a honeycomb catalyst body having excellent purification efficiency, low pressure loss, and mountability even in a limited space.

In addition, a honeycomb catalyst body of the present invention is effective in having excellent purification efficiency, low pressure loss, and mountability even in a limited space.

DESCRIPTION OF REFERENCE NUMERALS AND SYMBOLS 1, 11, 21, 31, 41: honeycomb structure, 2a, 2b: end face, 3: cell, 4: partition wall, 5, 15: catalyst layer, 10: plugged portion, 20: outer wall, 25: pore, 35: catalyst-layer carrying pore, 50, 60, 70, 80, 90: honeycomb catalyst body, 55: inlet end portion, 65: outlet end portion, 75: central portion, 100: test piece, 105: remaining rib, D: cell hydraulic diameter, H: height of remaining rib, $L_c$: full length of cell, P: cell pitch, T, t: partition wall thickness, v: observed range (viewing field)

BEST MODE FOR CARRYING OUT THE INVENTION

A best mode for carrying out the present invention will hereinbelow be described. However, the present invention is by no means limited to the following embodiments, and it should be understood that the present invention includes inventions where a suitable change, improvement, or the like, is given to the following embodiment on the basis of those skilled in the art within the range of not deviating from the gist of the present invention.

Figure 1:
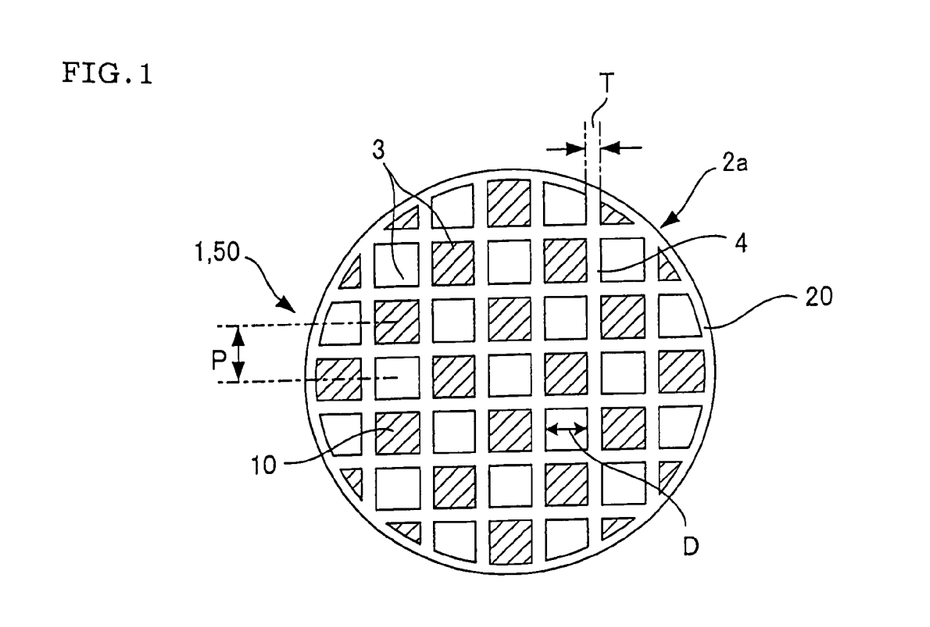
FIG. 1 is a front view schematically showing an embodiment of a honeycomb structure and honeycomb catalyst body of the present invention.
Figure 2:
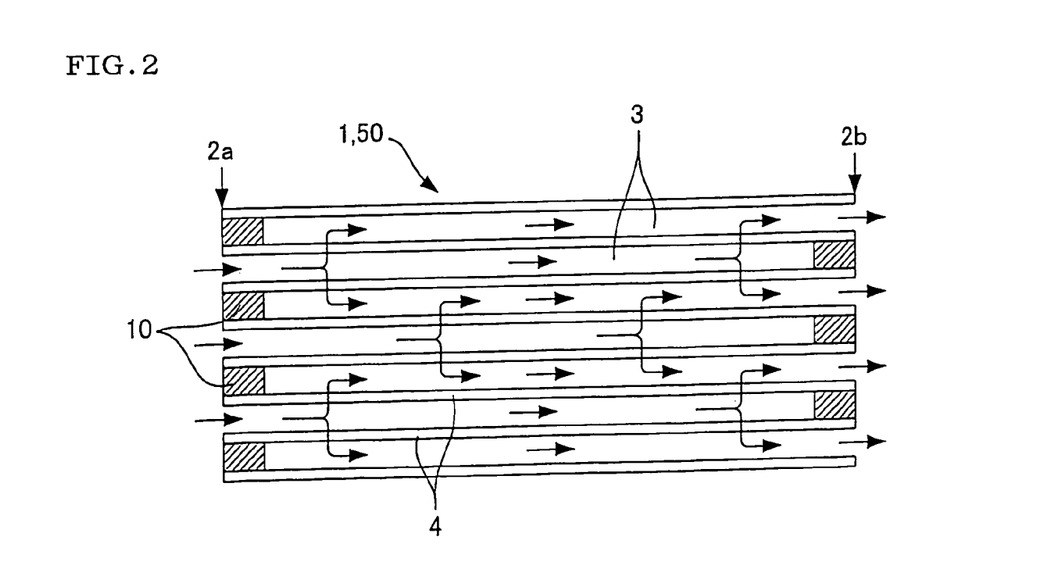
FIG. 2 is a cross-sectional view schematically showing an embodiment of a honeycomb structure and honeycomb catalyst body of the present invention.

FIG. 1 is a front view schematically showing an embodiment of a honeycomb structure and honeycomb catalyst body of the present invention. FIG. 2 is a cross-sectional view schematically showing an embodiment of a honeycomb structure and honeycomb catalyst body of the present invention. As shown in FIGS. 1 and 2, a honeycomb structure 1 of the present embodiment is provided with porous partition walls 4 having a large number of pores and plugged portions 10. The partition walls 4 are disposed so as to form a plurality of cells 3 communicating between two end faces 2a and 2b. In addition, the plugged portions 10 are disposed so as to plug the cells 3 on one of the end faces 2a and 2b of each cell. Incidentally, in FIG. 1, the reference numerals and symbols 10, P, D, and T denote outer wall, cell pitch, cell hydraulic diameter, and partition wall thickness, respectively.

In a honeycomb structure 1 of the present embodiment, a percentage of the number of carbon particulates contained in combustion exhaust gas satisfying the following condition (1) and passing through a honeycomb structure is 80% or more, preferably 85% or more, and further preferably 90%, at a space velocity of 25000/h.

Condition (1): the carbon particulates has a mean diameter of 0.07 to 0.2 μm, a ratio of the carbon particulates having a diameter of 1 μm or more is 0.1% or less in number, and a concentration of the carbon particulates is 10 mg/m$^3$.

When the percentage of the number of carbon particulates contained in combustion exhaust gas and passing through a honeycomb structure is made to be within the above range, in the case of using the honeycomb structure 1 having a predetermined catalyst loaded thereon as a honeycomb catalyst body 50, soot including carbon particulates contained in exhaust gas discharged from a diesel engine is hardly trapped by the partition walls 4, and most of it passes through the partition walls 4. That is, as shown in FIG. 2, exhaust gas flowing into the cells 3 of the honeycomb catalyst body 50 from one end face 2a side passes through the partition walls 4 and moves to the adjacent cells 3, and then flows outside from the other end face 2b. Here, since the percentage of the number of carbon particulates contained in a predetermined combustion exhaust gas and passing through the honeycomb structure 1 of the present embodiment is within a predetermined range, carbon particulates and the like contained in the exhaust gas are hardly trapped by the partition walls 4 or the honeycomb catalyst body 50 obtained by using the honeycomb structure 1. Therefore, by using the honeycomb structure 1 of the present embodiment, a honeycomb catalyst body 50 having low pressure loss and hardly rising pressure loss even in the case of being used for a long period can be obtained.

Figure 3:
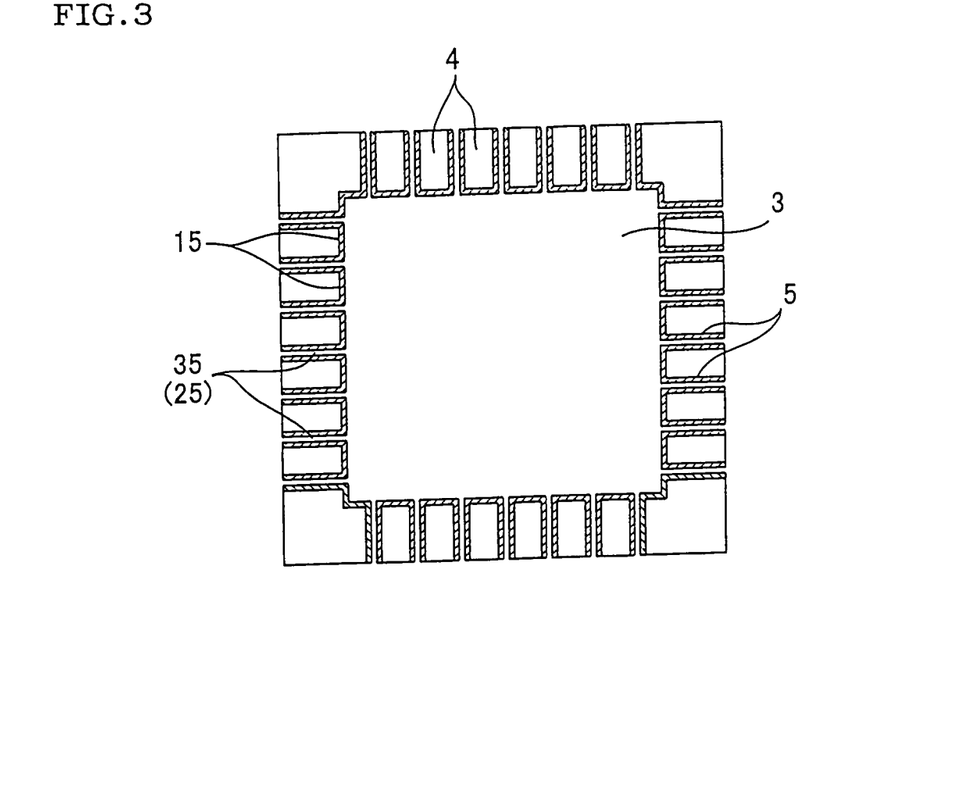
FIG. 3 is a partially enlarged view schematically showing an embodiment of a honeycomb catalyst body of the present invention.

In addition, by using a honeycomb structure 1 of the present embodiment, a catalyst layer 5 can be loaded on the surface of the pores 25 of the partition walls 4 unlike a conventional honeycomb catalyst body 60 as shown in FIGS. 4 to 6 (see FIG. 3). Therefore, there can be provided a compact honeycomb catalyst body 50 mountable even in a limited space and having excellent purification efficiency in comparison with a conventional honeycomb catalyst body. Incidentally, a honeycomb catalyst body 50 will be described later in detail.

Here, a method for measuring a percentage of the number of carbon particulates passing will be described. There is prepared, in the first place, combustion exhaust gas having 0.07 to 0.2 μm of a mean diameter of carbon particulates, 0.1% or less, in number, of a content ratio of carbon particulates having a diameter of 1 μm or more, and 10 mg/m³ of a concentration of carbon particulates. The combustion exhaust gas is sent into and discharged from a measurement sample (honeycomb structure or honeycomb catalyst body) under a temperature condition of 25 to 100° C. at a space velocity of (SV)=25000/h. The number of carbon particulates having a mean diameter of 0.1 μm contained in the combustion exhaust gas before being sent into the sample and the number of carbon particulates having a mean diameter of 0.1 μm contained in the combustion exhaust gas after being discharged are independently measured by the use of a scanning mobility particle sizer (SMPS). From the measured values, a percentage (%) of the number of carbon particulates passing can be calculated.

The cell hydraulic diameter D (m) and the permeability (m²) of a honeycomb structure 1 preferably satisfies the relation of (cell hydraulic diameter)²/(permeability)=2×10³ or more and less than 6×10⁵, more preferably satisfies the relation of (cell hydraulic diameter)²/(permeability)=5×10³ to 1×10⁵, and particularly preferably satisfies the relation of (cell hydraulic diameter)²/(permeability)=1×10⁴ to 5×10⁴.

Pressure loss (cell circulation pressure loss) generated when gas circulates in cells is in inverse proportion to the square of a hydraulic diameter of the cells. A ratio (partition wall passage pressure loss)/(cell circulation pressure loss) of pressure loss (partition wall passage pressure loss) generated when gas passes through partition walls to pressure loss (cell circulation pressure loss) generated when gas circulates in cells is in proportion to (cell hydraulic diameter)²/(permeability). It is preferable that (cell hydraulic diameter)²/(permeability) is 2×10³ or more because gas can easily flow uniformly over the entire range of the partition walls 4 of a honeycomb catalyst body 50 obtained by the use of the honeycomb structure 1. On the other hand, it is preferable that (cell hydraulic diameter)²/(permeability) is less than 6×10⁵ because pressure loss of the whole honeycomb catalyst body 50 obtained by the use of the honeycomb structure 1 hardly increases.

Incidentally, "permeability" in the present specification means a value of physical properties calculated from the following formula (1) and a value serving as an index representing a passage resistance when a predetermined gas passes an object (partition wall). In the following formula (1), C, F, T, V, D, and P denote permeability (m²), gas flow rate (cm³/s), sample thickness (cm), gas viscosity (dynes·sec/cm²), sample diameter (cm), and gas pressure (PSI), respectively. In addition, with respect to the numerical values in the following formula (1), 13.839 (PSI) equals 1 (atm), and 68947.6 (dynes·sec/cm²) equals 1 (PSI).

[Formula 1]

$$C=[8FTV/\{\pi D^2(P^2-13.839^2)/13.839\times 68947.6\}]\times 10^{-4} \quad (1)$$

Figure 9:
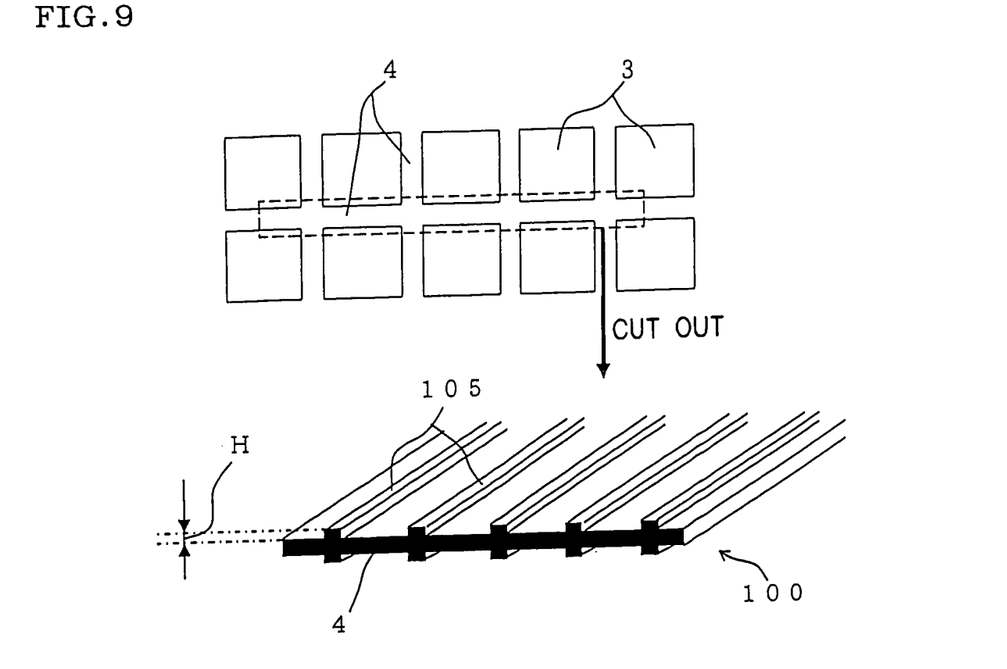
FIG. 9 is a schematic view explaining about a test piece used for measurement of permeability.

FIG. 9 is a schematic view explaining about a test piece used for measurement of permeability. As shown in FIG. 9, in the first place, a test piece 100 is cut out from a honeycomb structure or a honeycomb catalyst body in the state that a part (remaining rib 105) of the partition walls connected with a partition wall 4 is left so that the remaining rib has a height of 0.2 mm. The test piece 100 may have a shape of a square plane or a disc. Air at room temperature is sent in the test piece 100, and permeability at that time is calculated by the above formula (1). It is desirable to use a fluidity seal such as grease lest air should leak from a gap between the test piece 100 and a seal formed by the remaining rib 105. In addition, an air flow rate is adjusted so that flow velocity upon passing partition walls is 0.1 to 1 cm/sec on a calculation, and the result of calculation with this air flow rate is employed. Incidentally, in the case that the subject of measurement for permeability is partition walls of a honeycomb catalyst body, a way of attachment of a catalyst layer is different between the cell inner wall face and the cross-sectional face. However, in a honeycomb catalyst body using a honeycomb structure of the present embodiment, a catalyst layer is loaded on the inner surface of the pores. Therefore, influence by a remaining rib is small, and permeability of the partition walls of a honeycomb catalyst body can be measured by the same method as in the case of a honeycomb structure.

A honeycomb catalyst body 1 of the present embodiment has a density of the cells 3 (cell density) of preferably 0.25 to 46.5 cells/cm² (1.61 to 300 cpsi), more preferably 1.55 to 15.5 cells/cm² (10 to 100 cpsi), and particularly preferably 1.55 to 12.4 cells/cm² (10 to 80 cpsi). When the cell density is below 0.25 cells/cm², contact efficiency with exhaust gas tends to be insufficient. On the other hand, when the cell density is above 46.5 cells/cm², pressure loss tends to increase. Incidentally, "cpsi" is an abbreviation of "cells per square inch" and a unit representing the number of cells per one square inch. 10 cpsi almost equals to 1.55 cells/cm².

Thickness of the partition walls 4 (partition wall thickness T) is preferably 0.15 to 7 mm (5.9 to 276 mil), more preferably 0.4 to 2 mm (15.7 to 78.7 mil), and particularly preferably 0.7 to 1.5 mm (27.6 to 59 mil). When the partition wall thickness T is below 0.15 mm, strength is insufficient, and thermal shock resistance is sometimes deteriorated. On the other hand, when the partition wall thickness T is above 0.15 mm, pressure loss tends to increase. Incidentally, 1 mil is one thousandth of an inch, which is about 0.025 mm.

An average image maximum distance of the partition walls 4 of a honeycomb structure 1 of the present embodiment is preferably 43 μm or more, more preferably 50 to 500 μm, and particularly preferably above 250 to 500 μm or less. When the average image maximum distance is below 43 μm, particulates such as carbon particulates contained in exhaust gas discharged from, for example, a diesel engine can easily be trapped, which tends to cause rise in pressure loss. Incidentally, "pore diameter" is a value of physical properties measured by image analysis. Concretely, a SEM photograph of a cross-section of a partition wall is observed for at least 20 viewing fields with respect to a viewing field of length× width=t×t in the case that the partition wall thickness is defined as "t". Next, the maximum linear distance in a gap is measured within each of the viewing fields observed above, and the average value of the maximum linear distances measured with respect to all the visions is determined as "average image maximum distance".

Figure 10:
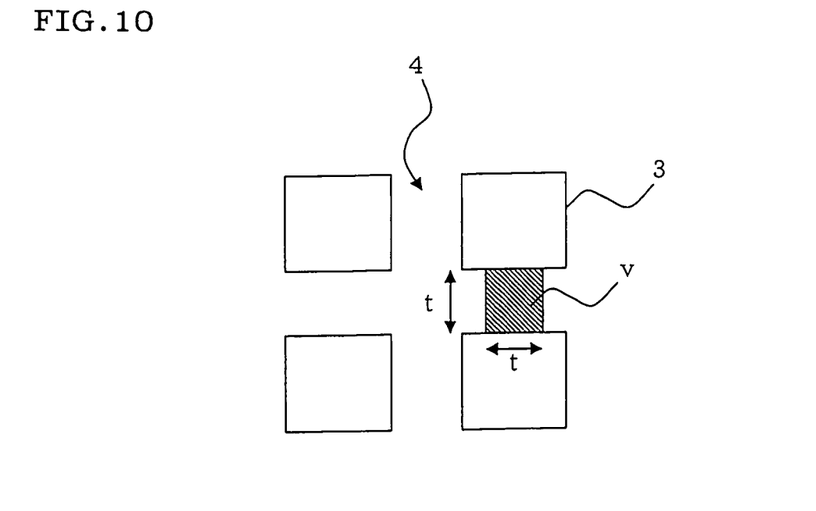
FIG. 10 is a plan view schematically showing a state of enlarging a part of an end face of an embodiment of a honeycomb structure of the present invention.
Figure 11:
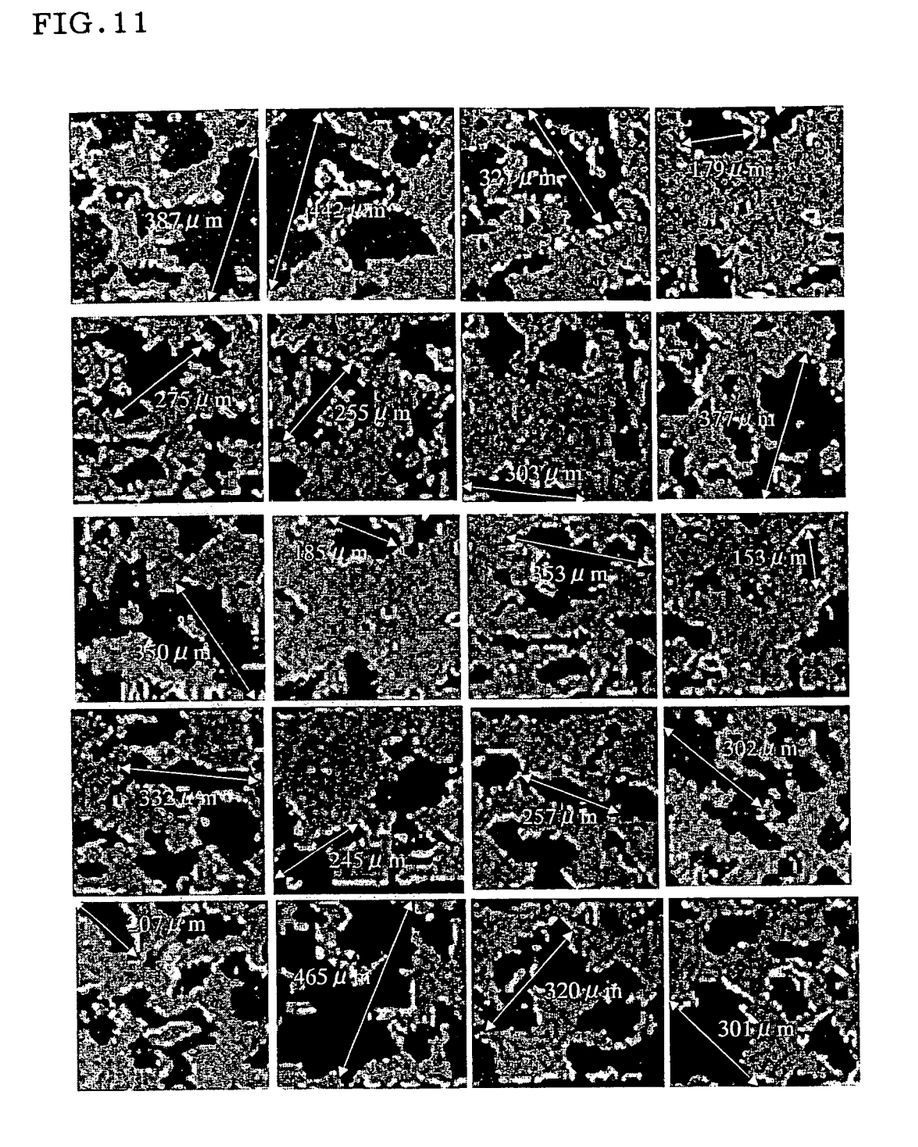
FIG. 11 is a SEM photograph of an embodiment of a honeycomb structure of the present invention.

For example, in a plan view where a part of an end face of a honeycomb structure is enlarged shown in FIG. 10, a region of t×t of a partition wall 4 is defined as one observation region (viewing field) v, SEM photographs are taken with respect to 20 viewing fields, and they are subjected to image analysis. Then, as shown in FIG. 11, the maximum linear distance is measured in each of the SEM photographs taken for 20 visions to obtain the average value. In SEM photographs of 20 viewing fields shown in FIG. 11, the maximum linear distances are 387 μm, 442 μm, 327 μm, 179 μm, 275 μm, 255 μm, 303 μm, 377 μm, 350 μm, 185 μm, 353 μm, 153 μm, 332 μm, 245 μm, 257 μm, 302 μm, 207 μm, 465 μm, 320 μm, and 301 μm from the top left toward right and from the top to the bottom. In this case, the average image maximum distance is 301 μm.

Incidentally, the SEM photographs shown in FIG. 11 were of 50 magnifications. For the image analysis, there can be used a commercial image analysis software, for example, Paint Shop ProX (trade name) produced by Corel Corporation. Any magnification of the SEM photograph can be employed as long as distinct images can be obtained, and, arbitrary magnifications of, for example, 10 to 1000 magnifications may be selected.

Figure 7:
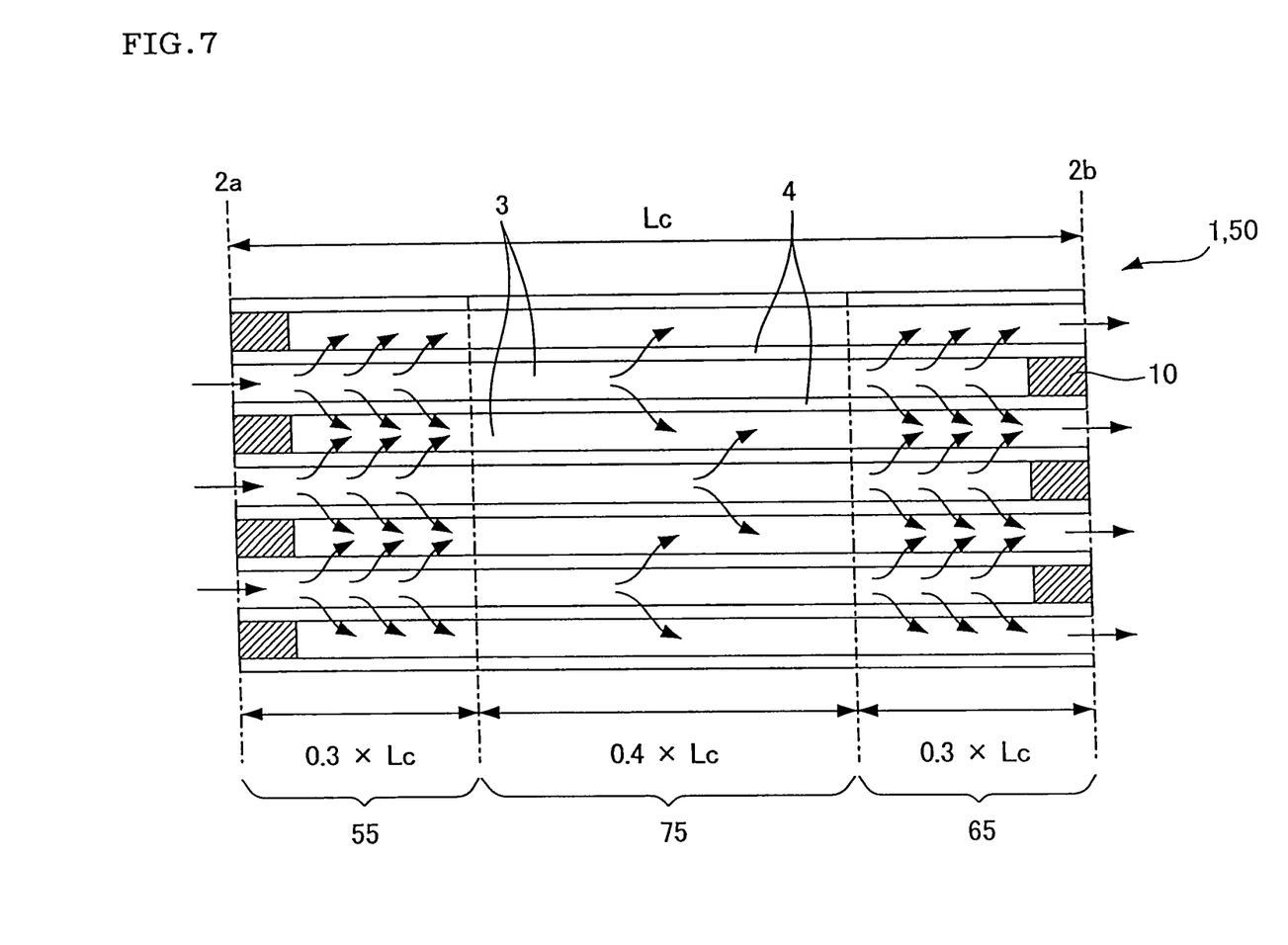
FIG. 7 is a cross-sectional view schematically explaining about both the end portions and the central portion of partition walls.
Figure 8:
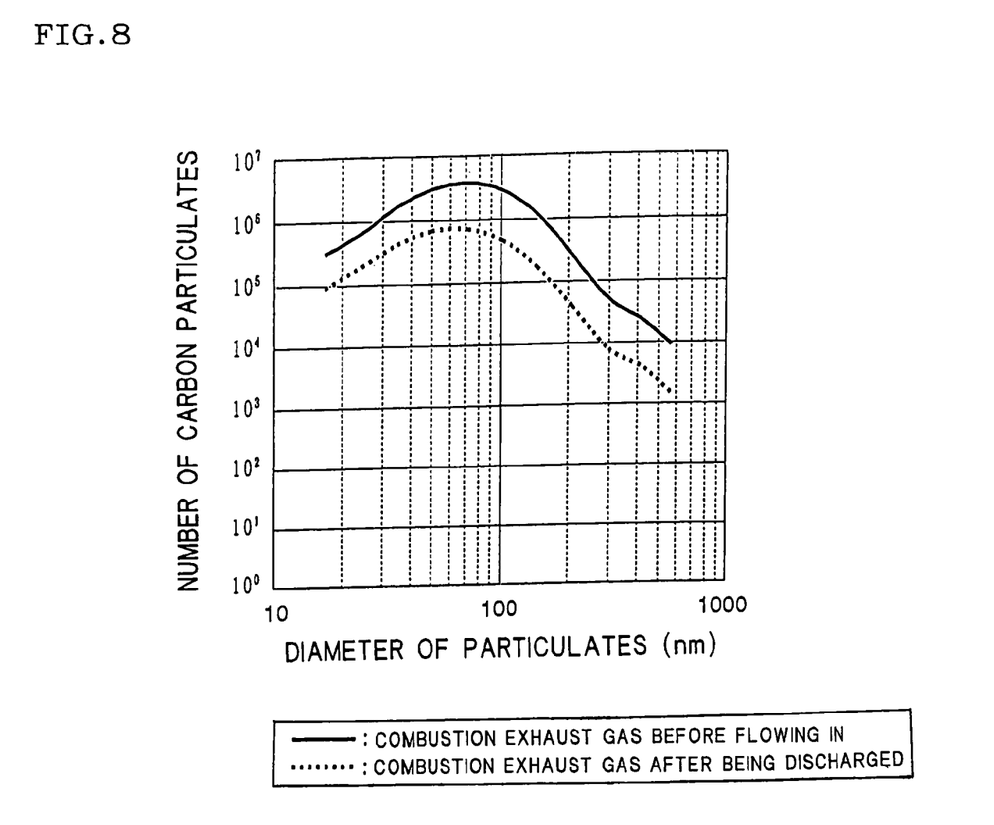
FIG. 8 is a chart showing, by plotting, the numbers of carbon particulates contained in exhaust gas before flowing in and after flowing out with respect to diameters of carbon particulates.

In the partition walls 4 of a honeycomb structure 1 of the present embodiment, the average image maximum distance at both the end portions in the longitudinal direction of the cells 3 is preferably 80% or less of the average image maximum distance in the central portion in the longitudinal direction of the cells 3, more preferably 60% or less, and particularly preferably 50% or less. Here, "both the end portions" and "central portion" of the partition walls in the present specification is defined as shown in FIG. 7. In the case that a length between the end portions 2a and 2b of the honeycomb structure 1 is defined as "cell full length $L_c$", the portion of 30% length of the cell full length (portion of 0.3×$L_c$) on an end face 2a side is called an inlet end portion 55, and the portion of 30% length of the cell full length (portion of 0.3×$L_c$) on an end face 2b side is called an outlet end portion 65. Incidentally, the inlet end portion 55 and the outlet end portion 65 in combination are called both the end portions. The portion of 0.4×$L_c$ obtained by excluding both the end portions (the inlet end portion 55 and the outlet end portion 65) from the honeycomb structure 1 is called the central portion 75.

As shown in FIG. 7, exhaust gas flowing into the cells 3 from the end face 2a side of the honeycomb structure 1 passes through the porous partition walls 4, flows into the adjacent cells 3, and flows out from the end face 2b. Here, it is presumed that the partition walls 4 have both a portion where flow velocity upon passing partition walls is high and a portion where flow velocity upon passing partition walls is low to generate a distribution of exhaust gas flow velocity upon passing partition walls. To be more concrete, it is considered that exhaust gas passage rate in the inlet end portion 55 and the outlet end portion 65 of the partition walls 4 is higher than that in the central portion 75. Therefore, by controlling the average image maximum distance of both the end portions (inlet end portion 55 and outlet end portion 65) of the partition walls 4 to be 80% or less of that in the central portion 75, exhaust gas easily passes through the partition walls 4 over the entire region at a uniform rate, and therefore, more excellent purification performance is exhibited.

The partition walls 4 preferably have a porosity of 30 to 80%, and more preferably 40 to 65%. When the porosity is below 30%, flow velocity upon passing partition walls increases and purification performance tends to deteriorate. On the other hand, when the porosity is above 80%, strength tends to be insufficient. Incidentally, "porosity" in the present specification means a value of physical properties measured by image analysis. Concretely, a SEM photograph of a cross-section of a partition wall is observed for at least 5 visions with respect to a viewing field of length×width=t×t in the case that the partition wall thickness is defined as "t". A gap area percentage is measured within each of the viewing fields observed above, and the average value of the values obtained by (the gap area percentage)$^{3/2}$ with respect to all the viewing fields is determined as "porosity".

A common logarithm standard deviation (pore diameter distribution σ) of pore diameter distribution in the partition walls is preferably 0.1 to 0.6, and more preferably 0.2 to 0.6. When the pore diameter distribution σ is below 0.1, pressure loss upon passing through partition walls tends to increase. On the other hand, when the pore diameter distribution σ is above 0.6, gas passes only through large pores, and purification performance tends to deteriorate. In the case of introducing a "common logarithm standard deviation of pore diameter distribution", a value obtained by measuring with a mercury porosimeter as the "pore diameter distribution". With respect to the obtained pore diameter distribution, a common logarithm standard deviation (sd in the following formula (5): standard deviation) is obtained by the use of the following formulae (2) to (5). Incidentally, in a differential pore capacity shown by "f" in the following formulae (3) and (4), provided that, for example, a pore volume of pores having a pore diameter of Dp1 or less (accumulation of pore diameters of 0 to Dp1) is V1 and that a pore volume of pores having a pore diameter of Dp2 or less (accumulation of pore diameters of 0 to Dp2) is V2, the differential pore volume f2 is a value shown by f2=V2−V1. In the following formulae (2) to (5), "Dp", "f", "x", "xav", "s$^2$", and "sd" denote pore diameter (μm), differential pore volume (mL/g), common logarithm of a pore diameter Dp, average value of x, dispersion of x, and standard deviation of x (common logarithm standard deviation of pore diameter distribution), respectively. In addition, "s" in the following formulae and Table 7 denotes pore diameter distribution σ.

[Formula 2]

$$x = \log Dp \tag{2}$$

$$xav = \Sigma fx / \Sigma f \tag{3}$$

$$s^2 = \Sigma x^2 f / \Sigma f - xav^2 \tag{4}$$

$$sd = \sqrt{s^2} \tag{5}$$

Incidentally, in the case of a honeycomb structure having a cell density of 0.25 to 46.5/cm$^2$, a partition wall thickness of 0.15 to 7 mm, an average image maximum distance of partition walls of 43 μm or more, a porosity of partition walls of 30 to 80%, and a common logarithm standard deviation of pore diameter distribution in partition walls of 0.1 to 0.6, it is suitable as a carrier for constituting a catalyst body for purifying an exhaust gas discharged from industrial combustion machinery (for industry).

In addition, in the case of a honeycomb structure having a cell density of 1.55 to 12.4/cm², a partition wall thickness of 0.7 to 1.5 mm, an average image maximum distance of partition walls of above 250 μm and 500 μm or less, a porosity of partition walls of 40 to 65%, and a common logarithm standard deviation of pore diameter distribution in partition walls of 0.2 to 0.6, it is suitable particularly as a carrier for constituting a catalyst body for purifying an exhaust gas discharged from an automobile engine (for mounting on an automobile) among carriers constituting catalyst bodies for industry.

Suitable examples of a material constituting the honeycomb structure 1 of the present embodiment include a material containing ceramic as the main component and a sintered metal. In the case that a honeycomb structure 1 of the present embodiment is constituted by material containing ceramic as the main component, suitable examples of the ceramic include silicon carbide, cordierite, alumina titanate, sialon, mullite, silicon carbide, zirconium phosphate, zirconia, titania, alumina, silica, and a combination thereof. Particularly suitable are ceramics such as silicon carbide, cordierite, mullite, silicon nitride, and alumina from the viewpoint of alkali resistant properties. Of these, oxide ceramics are preferable also in respect of costs.

In a honeycomb structure 1 of the present embodiment, the cells preferably has a thermal expansion coefficient of below $1.0 \times 10^{-6}/°C$., preferably below $0.8 \times 10^{-6}/°C$., and more preferably below $0.5 \times 10^{-6}/°C$. in an communicating direction at 40 to 800° C. When the thermal expansion coefficient in a cell communicating direction at 40 to 800° C. is below $1.0 \times 10^{-6}/°C$., thermal stress upon being exposed to exhaust gas can be suppressed to be within a permissible range, and fracture of the honeycomb structure due to thermal stress can be inhibited.

In a honeycomb structure 1 of the present embodiment, a ratio (L/D) of a length (hereinbelow sometimes referred to as "whole length L") of the cells in the direction of communication to the equivalent diameter (D) is preferably 0.3 or more and less than 0.75, more preferably 0.3 to 0.5, and particularly preferably 0.3 to 0.4. When the whole length L is too long (when the ratio of L/D is too high), flow velocity upon passing partition walls is not uniform in the axial direction of the carrier to generate distribution. That is, a large amount of exhaust gas flows through partition walls in the vicinity of the outlet, and load is applied only on the catalyst in the portion, and thereby, sometimes, the catalyst coated on the other portions is not used effectively to be in vain. On the other hand, when L/D is too low, the ratio of the length of a plugged portion to the whole length L (percentage) increases. Since this increase means that a weight ratio of the portion which cannot be used for catalyst-carrying increases, warming ability of the catalyst is decreased, and purification performance is prone to deteriorate. Therefore, by specifying the ratio of L/D within the above range, distribution of flow velocity upon passing partition walls becomes uniform, and therefore the whole partition walls can effectively be used to enhance purification performance. Incidentally, the equivalent diameter D is a value obtained by "4×cross-sectional area/length of outer periphery of cross-section". Here, a "cross-sectional area" is an area of a cross-section taken along a direction of a diameter on a plane perpendicular to a cell communicating direction. A "length of outer periphery of cross-section" means a length of outer periphery of the above cross-section.

In addition, in a honeycomb structure 1 of the present embodiment, a cross-section taken along a direction of a diameter on a plane perpendicular to a cell communicating direction preferably has a shape suitable for an inner shape of an exhaust gas system for installation. Examples of the shape include a circle, an oval, an ellipse, a trapezoid, a triangle, a rectangle, a hexagon, and an asymmetric special shape. Of these, a circle, an oval, or an ellipse is preferably employed.

A honeycomb structure of the present invention can be produced according to a manufacturing method in accordance with a conventionally known method for manufacturing a diesel particulate filter (DPF). However, in a honeycomb structure of the present invention, a percentage of the number of carbon particulates contained in predetermined combustion exhaust gas and passing through a honeycomb structure is within a predetermined range. Therefore, for example, in the case that chemical composition of material is suitably adjusted and that a pore former is used to give a porous structure, a percentage of the number of carbon particulates contained in predetermined combustion exhaust gas and passing through a honeycomb structure can be made within a predetermined range by suitably adjusting kind, particle diameter, addition amount, and the like, of the pore former to be used.

Next, an embodiment of a honeycomb catalyst body of the present invention will be described. As shown in FIGS. 1 to 3, a honeycomb catalyst body 50 of the present embodiment is provided with a honeycomb structure 1 and a catalyst layer 5 containing catalyst. The catalyst layer 5 is loaded in layer on the inner surface of pores 25. A large number of catalyst-carrying pores 35 are formed in partition walls. Incidentally, the catalyst-carrying pores 35 mutually communicate with adjacent cells 3. A catalyst layer 15 may be formed on the inner surface of the cells 3.

In a honeycomb structure 1, a percentage of the number of carbon particulates contained in predetermined combustion exhaust gas and passing through a honeycomb structure is within a predetermined range. Therefore, in a honeycomb catalyst body 50 of the present embodiment, where a catalyst layer 5 is loaded on the inner surfaces of the pores 25 of the honeycomb structure 1, soot including carbon particulates contained in exhaust gas discharged from a diesel engine is hardly trapped by the partition walls 4 and almost all the soot passes through the partition walls 4. That is, as shown in FIG. 2, exhaust gas flowing into the cells 3 of the honeycomb catalyst body 50 from one end face 2a side passes through the partition walls 4, moves to the adjacent cells 3, and is discharged outside from the other end face 2b side. Therefore, a honeycomb catalyst body 50 of the present embodiment has low pressure loss hardly rising pressure loss even in the case of being used for a long period.

In addition, in a honeycomb catalyst body 50 of the present embodiment, a catalyst layer 5 is loaded on the surfaces of the pores 25 of the partition walls 4 unlike conventional honeycomb catalyst bodies 60 as shown in FIGS. 4 to 6. Therefore, it is excellent in purification performance in comparison with conventional honeycomb catalyst bodies, and it is a compact catalyst body mountable even in a limited space.

In addition, the cell hydraulic diameter D (m) and the permeability (m²) of the partition walls preferably satisfies the relation of (cell hydraulic diameter)²/(permeability)=$2 \times 10^3$ or more and less than $6 \times 10^5$, more preferably satisfies the relation of (cell hydraulic diameter)²/(permeability)=$5 \times 10^3$ to $1 \times 10^5$, and particularly preferably satisfies the relation of (cell hydraulic diameter)²/(permeability)=$1 \times 10^4$ to $5 \times 10^4$. When "(cell hydraulic diameter)²/(permeability)" is $2 \times 10^3$ or more, it is preferable because gas can easily flow uniformly over the entire region of the partition walls 4. On the other hand, when "(cell hydraulic diameter)²/(permeability)" is less than $6 \times 10^5$, it is preferable because pressure loss of the whole honeycomb catalyst body 50 hardly increases.

An average image maximum distance of the partition walls 4 in the state that the catalyst layer 5 is loaded, that is, in the state that catalyst-carrying pores 35 are formed is preferably 40 μm or more, more preferably 50 to 500 μm, and particularly preferably above 250 to 500 μm or less. When the average image maximum distance is below 40 μm, particulates such as carbon particulates contained in exhaust gas discharged from, for example, a diesel engine can easily be trapped, which tends to cause rise in pressure loss.

In the partition walls 4 of a honeycomb catalyst body 50 of the present embodiment, the average image maximum distance at both the end portions (inlet end portion 55 and outlet end portion 65) in the longitudinal direction of the cells 3 is preferably 80% or less of the image maximum distance average in the central portion 75 in the longitudinal direction of the cells 3, more preferably 60% or less, and particularly preferably 50% or less (see FIG. 7). Thus, by controlling the average image maximum distance of both the end portions (inlet end portion 55 and outlet end portion 65) of the partition walls 4 to be smaller than that in the central portion 75, exhaust gas easily passes through the partition walls 4 over the entire region at a uniform rate, and therefore, more excellent purification performance is exhibited.

The partition walls 4 preferably have a porosity of 30 to 80%, and more preferably 40 to 65% in the state that the catalyst layer 5 is loaded, that is, in the state that catalyst-carrying pores 35 are formed. When the porosity is below 30%, flow velocity upon passing partition walls increases and purification performance tends to deteriorate. On the other hand, when the porosity is above 80%, strength tends to be insufficient.

In the case of a honeycomb catalyst body having an average image maximum distance of partition walls of 40 μm or more and a porosity of partition walls of 30 to 80%, it is suitable as a catalyst body for purifying an exhaust gas discharged from industrial combustion machinery (for industry). In addition, in the case of a honeycomb catalyst body having an average image maximum distance of partition walls of above 250 μm and 500 μm or less and a porosity of partition walls of 40 to 65%, it is suitable particularly as a carrier for constituting a catalyst body for purifying an exhaust gas discharged from an automobile engine (for mounting on an automobile) among carriers constituting catalyst bodies for industry.

Examples of the catalyst contained in the catalyst layer 50 constituting a honeycomb structure 50 of the present embodiment include (1) a gasoline engine exhaust gas purification ternary catalyst, (2) a gasoline engine or diesel engine exhaust gas purification oxidation catalyst, (3) a $NO_x$ selective reduction SCR catalyst, and (4) a $NO_x$ adsorbent catalyst.

A gasoline engine exhaust gas purification three way catalyst includes a carrier coat for coating the partition walls of a Honeycomb structure (honeycomb carrier) and a noble metal dispersed in the carrier coat. The carrier coat is constituted by, for example, active alumina. Suitable examples of the noble metal dispersed in the carrier coat include Pt, Rh, Pd, and a combination thereof. Further, the carrier coat further contains, for example, a compound such as cerium oxide, zirconium oxide, and silica, or a mixture thereof. Incidentally, the total amount of noble metals is preferably 0.17 to 7.07 g per liter of the volume of the honeycomb structure.

A gasoline engine or diesel engine exhaust gas oxidation catalyst contains a noble metal. The noble metal is preferably one or more selected from the group consisting of Pt, Rh, and Pd. Incidentally, the total amount of noble metals is preferably 0.17 to 7.07 g per liter of the volume of the honeycomb structure. A $NO_x$ selective reduction SCR catalyst contains at least one kind selected from a group consisting of metal-substituted zeolite, vanadium, titania, tungsten oxide, silver, and alumina.

A $NO_x$ adsorbent catalyst contains alkali metal and/or alkali earth metal. Examples of the alkali metal include K, Na, and Li. Examples of the alkali earth metal include Ca. Incidentally, the total amount of K, Na, Li, and Ca is preferably 0.5 g or more per liter of the volume of the honeycomb structure.

A honeycomb catalyst body of the present invention can be manufactured by loading a catalyst on the aforementioned honeycomb structure according to a manufacturing method in accordance with a conventionally known method. To be concrete, in the first place, catalyst slurry containing a catalyst is prepared. Next, the catalyst slurry is coated on the surfaces of the pores of the partition walls of the honeycomb structure by a suction method or the like. Then, the slurry is dried at room temperature or under heating conditions to manufacture a honeycomb catalyst body of the present invention.

EXAMPLE

The present invention will hereinbelow be described in more detail on the basis of Examples. However, the present invention is by no means limited to these Examples.

[Average Image Maximum Distance]

Pore diameters were measured by image analysis, and the average image maximum distance was calculated. Concretely, a SEM photograph of a cross-section of a partition wall was observed for at least 20 viewing fields with respect to a viewing field of length×width=t×t in the case that the partition wall thickness was defined as "t". Next, the maximum linear distance in a gap was measured within each of the viewing fields observed above, and the average value of the maximum linear distances measured with respect to all the viewing fields was determined as the "average image maximum distance".

[Standard Deviation ($\sigma$) of Pore Diameter Distribution]

A pore diameter distribution was measured by the use of a mercury porosimeter (Trade name: Auto Pore III, type 9405, produced by Micromeritics Instruments Corp.), and the standard deviation of the pore diameter distribution (pore diameter distribution $\sigma$) was calculated.

[Porosity]

Porosity was measured by image analysis. Concretely, a SEM photograph of a cross-section of a partition wall was observed for at least 5 viewing fields with respect to a viewing field of length×width=t×t in the case that the partition wall thickness was defined as "t". A gap area percentage was measured within each of the viewing fields observed above, and the average value of the values obtained by (the gap area percentage)$^{3/2}$ with respect to all the viewing fields was determined as "porosity".

[Permeability]

A part of partition walls was taken out and machined to obtain a sample without unevenness. This sample was sandwiched from the top and the bottom with a sample holder having a diameter of 20 mm lest gas should leak. Then, a certain gas pressure was applied to the sample to give a pressure of 1 atm on the downstream side of the sample, and gas was sent into the sample. At this time, permeability was calculated on the basis of the following formula (1) with respect to the gas passed through the sample. Incidentally, in the formula (1), C, F, T, V, D, and P denote permeability ($m^2$), gas flow rate ($cm^3/s$), sample thickness (cm), gas viscosity (dynes·sec/$cm^2$), sample diameter (cm), and gas pressure (PSI), respectively. In addition, with respect to the numerical values in the following formula (1), 13.839 (PSI) equals 1 (atm), and 68947.6 (dynes·sec/cm²) equals 1 (PSI).
[Formula 3]

$$C=[8FTV/\{\pi D^2(P^2-13.839^2)/13.839\times68947.6\}]\times10^{-4} \quad (1)$$

[Percentage of the Number of Carbon Particulates Passing]

There was used combustion exhaust gas having 0.07 to 0.2 µm of a mean diameter of carbon particulates, 0.1% or less, in number, of a content ratio of carbon particulates having a diameter of 1 µm or more, and 10 mg/m³ of a concentration of carbon particulates. The combustion exhaust gas was sent into and discharged from a honeycomb structure or honeycomb catalyst body under a temperature condition of 25 to 100° C. at a space velocity of (SV)=25000/h. The number of carbon particulates having a mean diameter of 0.1 µm contained in the combustion exhaust gas before being sent into the honeycomb structure or honeycomb catalyst body and the number of carbon particulates having a mean diameter of 0.1 µm contained in the combustion exhaust gas after being discharged were independently measured by the use of Scanning Mobility Particle Sizer (SMPS), Model 3936-Series, produced by CTI Corporation Ltd. From the measured values, a percentage (%) of the number of carbon particulates passing was calculated. Incidentally, as a reference document, a chart showing, by plotting, the numbers of carbon particulates with respect to diameters of carbon particulates contained in combustion exhaust gas before it is sent into the honeycomb structure or honeycomb catalyst body and after it is discharged.

[Purification Rate]

Cumbustion gas containing 7 vol % of oxygen, 10 vol % of steam, 10 vol % of carbon dioxide, 20 (carbon molar number) ppm of hydrocarbon, and the rest of nitrogen was sent into a honeycomb structure or honeycomb catalyst body at a temperature of 200° C. at a space velocity (SV) of 100000/h. The purification rate (%) was calculated from a hydrocarbon content of the combustion gas before and after being sent into the honeycomb structure or honeycomb catalyst body.

[Purificaton Index]

The above purification rate (standard purification rate (%)) was calculated by the use of a honeycomb catalyst body to be compared, and a purification index (%) was calculated as a rate with respect to the standard purification rate. Here, "purification index=200%" means that it is twice the purification rate of the honeycomb structure to be compared. Incidentally, with respect to a honeycomb catalyst body for automobile use, one prepared by loading a catalyst on a simple honeycomb structure (with no plugged portion) having a cell density of 600 cpsi (93 cells/cm²) and a partition wall thickness of 4.5 mil (0.1143 mm) was employed for the comparison (see FIGS. 4 to 6). In addition, with respect to a honeycomb catalyst body for industrial use, one prepared by loading a catalyst on a simple honeycomb structure (with no plugged portion) having a cell density of 30 cpsi (4.65 cells/cm²) and a partition wall thickness of 32 mil (0.8128 mm) was employed for the comparison (see FIGS. 4 to 6).

[Pressure Loss]

Air was circulated with a flow velocity of 0.5 m³/min at room temperature to measure pressure loss. Pressure loss (standard pressure loss) of a honeycomb catalyst body for comparison having the same shape, the same cell density, and the same partition wall thickness was measured to calculate a proportion with respect to the standard pressure loss (percentage of increase in pressure loss (%)). In addition, evaluations were given as "Present" in the case that the percentage of increase in pressure loss was 20% or more and as "None" in the case that the percentage of increase in pressure loss was below 20%.

[Long Term Clogging Resistance]

Combustion gas obtained by combusting a fuel obtained by adding 5 parts by mass of a commercial engine lubricating oil with respect to 95 parts by mass of fuel light oil for a light oil burner in the state that soot is not generated in a lean condition was sent into a honeycomb catalyst body for a long term at 600° C. with a flow velocity of 2.1 Nm/min to evaluate "long term clogging resistance" with the following standard.

Good: No problem, good
Fair: Practically usable though there is some clogging
Bad: Practically unusable due to clogging Examples 1 to 24, Comparative Examples 1, 2

To 100 parts by mass of a cordierite forming raw material prepared by combining some selected from talc, kaolin, calcined kaolin, alumina, calcium hydroxide, and silica at a predetermined ratio to have the chemical composition of 42 to 56% by mass of $SiO_2$, 0 to 45% by mass of $Al_2O_3$, and 12 to 16% by mass of MgO, were added 12 to 25 parts by mass of graphite as a pore former and 5 to 15 parts by mass of a synthetic resin. To the mixture were further added an appropriate amount of a methyl cellulose and a surfactant. Then, water was further added to the mixture, and the mixture was kneaded to prepare clay. The clay was subjected to vacuum degassing and subsequently to extrusion forming to obtain honeycomb formed bodies. After the honeycomb formed bodies were dried, they were fired at the highest temperature of 1400 to 1430° C. to obtain honeycomb fired bodies. By plugging one of the end portions of each cell of the obtained honeycomb fired bodies to give a checkerwise pattern and firing the honeycomb fired bodies again, honeycomb structures (Examples 1 to 24, Comparative Examples 1, 2) each having a pore structure of partition walls shown in Table 1, a diameter of 144 mm, and the entire length of 152 mm were manufactured. The results of measuring the percentage of the number of carbon particulates passing through each of the honeycomb structures are shown in Table 1.

Incidentally, a pore structure of the partition walls was adjusted by suitably adjusting chemical composition of the cordierite forming raw material, particle size of the pore former, and amount of the pore former added. In addition, the plugged portion had a depth of plugging of 10 mm from an end face.

TABLE 1

| | (a) | | | | | | | |
|---|---|---|---|---|---|---|---|---|
| | Cell density | | | Partition wall thickness | | Cell hydraulic diameter | Average image maximum distance | Porosity |
| | (cells/cm²) | (cpsi) | Cell pitch (mm) | (mm) | (mil) | (m) | (µm) | (%) |
| Example 1 | 12.40 | 80 | 2.84 | 0.508 | 20 | 0.0023 | 100 | 52 |
| Example 2 | 7.75 | 50 | 3.59 | 0.508 | 20 | 0.0031 | 100 | 52 |

TABLE 1-continued

| | | | | | | | | |
|---|---|---|---|---|---|---|---|---|
| Example 3 | 7.75 | 50 | 3.59 | 0.508 | 20 | 0.0031 | 260 | 52 |
| Example 4 | 12.40 | 80 | 2.84 | 0.508 | 20 | 0.0023 | 750 | 52 |
| Example 5 | 31.00 | 200 | 1.80 | 0.2032 | 8 | 0.0016 | 100 | 52 |
| Example 6 | 12.40 | 80 | 2.84 | 0.508 | 20 | 0.0023 | 900 | 52 |
| Comp. Ex. 1 | 12.40 | 80 | 2.84 | 0.508 | 20 | 0.0023 | 45 | 52 |
| Example 7 | 12.40 | 80 | 2.84 | 0.508 | 20 | 0.0023 | 280 | 52 |
| Example 8 | 12.40 | 80 | 2.84 | 0.508 | 20 | 0.0023 | 500 | 52 |
| Example 9 | 15.50 | 100 | 2.54 | 0.4318 | 17 | 0.0021 | 50 | 52 |
| Example 10 | 15.50 | 100 | 2.54 | 0.4318 | 17 | 0.0021 | 400 | 52 |
| Example 11 | 46.50 | 300 | 1.47 | 0.3048 | 12 | 0.0012 | 50 | 52 |
| Comp. Ex. 2 | 46.50 | 300 | 1.47 | 0.3048 | 12 | 0.0012 | 25 | 52 |
| Example 12 | 46.50 | 300 | 1.47 | 0.3048 | 12 | 0.0012 | 450 | 52 |
| Example 13 | 0.25 | 1.61 | 20.02 | 6.985 | 275 | 0.0130 | 450 | 49 |
| Example 14 | 1.55 | 10 | 8.03 | 1.016 | 40 | 0.0070 | 200 | 49 |
| Example 15 | 1.55 | 10 | 8.03 | 1.016 | 40 | 0.0070 | 260 | 49 |
| Example 16 | 1.55 | 10 | 8.03 | 1.016 | 40 | 0.0070 | 150 | 49 |
| Example 17 | 0.25 | 1.61 | 20.02 | 6.985 | 275 | 0.0130 | 250 | 49 |
| Example 18 | 0.25 | 1.61 | 20.02 | 6.985 | 275 | 0.0130 | 5000 | 49 |
| Example 19 | 15.5 | 100 | 2.54 | 0.4318 | 17 | 0.0021 | 250 | 60 |
| Example 20 | 15.5 | 100 | 2.54 | 0.4318 | 17 | 0.0021 | 260 | 63 |
| Example 21 | 15.5 | 100 | 2.54 | 0.4318 | 17 | 0.0021 | 270 | 64 |
| Example 22 | 15.5 | 100 | 2.54 | 0.4318 | 17 | 0.0021 | 290 | 70 |
| Example 23 | 15.5 | 100 | 2.54 | 0.4318 | 17 | 0.0021 | 200 | 65 |
| Example 24 | 15.5 | 100 | 2.54 | 0.4318 | 17 | 0.0021 | 600 | 65 |

(b)

| | Permeability ($m^2$) | (Cell hydraulic diameter)$^2$/ Permeability | Pore diameter distribution ($\sigma$) | Percentage of the number of carbon particulates passing (%) | Purification index (%) | Rate of increase in pressure loss (%) | Long term clogging resistance |
|---|---|---|---|---|---|---|---|
| Example 1 | $3.43 \times 10^{-11}$ | $1.59 \times 10^5$ | 0.3 | 85 | | | |
| Example 2 | $3.43 \times 10^{-11}$ | $2.77 \times 10^5$ | 0.3 | 85 | | | |
| Example 3 | $2.32 \times 10^{-10}$ | $4.10 \times 10^4$ | 0.3 | 95 | | | |
| Example 4 | $1.93 \times 10^{-9}$ | $2.82 \times 10^3$ | 0.3 | 98 | | | |
| Example 5 | $3.43 \times 10^{-11}$ | $7.40 \times 10^4$ | 0.4 | 83 | | | |
| Example 6 | $2.78 \times 10^{-9}$ | $1.96 \times 10^3$ | 0.3 | 98 | | | |
| Comp. Ex. 1 | $6.94 \times 10^{-12}$ | $7.83 \times 10^5$ | 0.3 | 58 | | | |
| Example 7 | $2.69 \times 10^{-10}$ | $2.02 \times 10^4$ | 0.3 | 95 | | | |
| Example 8 | $8.57 \times 10^{-10}$ | $6.34 \times 10^3$ | 0.4 | 98 | | | |
| Example 9 | $8.57 \times 10^{-12}$ | $5.19 \times 10^5$ | 0.3 | 82 | | | |
| Example 10 | $5.49 \times 10^{-10}$ | $8.10 \times 10^3$ | 0.4 | 95 | | | |
| Example 11 | $8.57 \times 10^{-12}$ | $1.57 \times 10^5$ | 0.5 | 82 | | | |
| Comp. Ex. 2 | $2.14 \times 10^{-12}$ | $6.30 \times 10^5$ | 0.5 | 20 | | | |
| Example 12 | $6.94 \times 10^{-10}$ | $1.94 \times 10^3$ | 0.5 | 94 | | | |
| Example 13 | $6.94 \times 10^{-10}$ | $2.45 \times 10^5$ | 0.5 | 93 | | | |
| Example 14 | $1.37 \times 10^{-10}$ | $3.59 \times 10^5$ | 0.6 | 92 | | | |
| Example 15 | $2.32 \times 10^{-10}$ | $2.12 \times 10^5$ | 0.6 | 95 | | | |
| Example 16 | $7.71 \times 10^{-11}$ | $6.38 \times 10^5$ | 0.6 | 83 | | | |
| Example 17 | $2.14 \times 10^{-10}$ | $7.93 \times 10^5$ | 0.5 | 85 | | | |
| Example 18 | $8.57 \times 10^{-8}$ | $1.98 \times 10^3$ | 0.5 | 96 | | | |
| Example 19 | $1.10 \times 10^{-11}$ | $4.00 \times 10^5$ | 0.55 | | 200 | 5 | Good |
| Example 20 | $1.20 \times 10^{-10}$ | $3.68 \times 10^5$ | 0.28 | | 220 | 3 | Good |
| Example 21 | $1.55 \times 10^{-11}$ | $2.85 \times 10^5$ | 0.5 | | 230 | 3 | Good |
| Example 22 | $1.70 \times 10^{-11}$ | $2.59 \times 10^5$ | 0.45 | | 230 | 3 | Good |
| Example 23 | $0.95 \times 10^{-11}$ | $4.64 \times 10^5$ | 0.55 | | 180 | 15 | Fair |
| Example 24 | $8.60 \times 10^{-10}$ | $5.13 \times 10^5$ | 0.55 | | 110 | 2 | Good |

Example 25

A honeycomb structure having a pore structure of partition walls shown in Table 2, a diameter of 144 mm, and a length of 152 mm was manufactured in the same manner as in the above Examples 1 to 24 and Comparative Examples 1 and 2 except that a chemical composition of the cordierite forming material, a particle diameter of the pore former, an amount of the pore former added, and the like, are suitably adjusted. A percentage of the number of carbon particulates passing through the honeycomb structure is shown in Table 2.

Example 26 and 27

Honeycomb structures (Examples 26 and 27) each having a pore structure of partition walls shown in Table 2, a diameter of 144 mm, and a length of 152 mm are manufactured in the same manner as in the above Examples 1 to 24 and Comparative Examples 1 and 2 except that a chemical composition of the cordierite forming material, a particle diameter of the pore former, an amount of the pore former added are suitably adjusted and that a honeycomb structure having partition walls having the same pore diameter as a whole was manufactured in advance and that partition walls at both the end portions were then impregnated with slurry prepared with a raw material having smaller particle diameters by immersing the partition walls at both the end portions in the slurry. The results of measurement for a percentage of the number of carbon particulates passing are shown in Table 2.

TABLE 2

(a)

| | Mean pore diameter (relative value) | | | Cell density | | Cell pitch | Partition wall thickness | |
|---|---|---|---|---|---|---|---|---|
| | Inlet end portion | Central portion | Outlet end portion | (cells/cm$^2$) | (cpsi) | (mm) | (mm) | (mil) |
| Example 25 | 1 | 1 | 1 | 31.00 | 200 | 1.80 | 0.2032 | 8 |
| Example 26 | 0.75 | 1 | 0.75 | 31.00 | 200 | 1.80 | 0.2032 | 8 |
| Example 27 | 0.5 | 1 | 0.5 | 31.00 | 200 | 1.80 | 0.2032 | 8 |

(b)

| | Cell hydraulic diameter (m) | Average image maximum distance (μm) | Porosity (%) | Permeability (m$^2$) | (Cell hydraulic diameter)$^2$/ Permeability | Pore diameter distribution (σ) | Percentage of the number of carbon particulates passing (%) |
|---|---|---|---|---|---|---|---|
| Example 25 | 0.0016 | 100 | 52 | $3.43 \times 10^{-11}$ | $7.40 \times 10^4$ | 0.4 | 83 |
| Example 26 | 0.0016 | 100 | 52 | $3.43 \times 10^{-11}$ | $7.40 \times 10^4$ | 0.4 | 85 |
| Example 27 | 0.0016 | 100 | 52 | $3.43 \times 10^{-11}$ | $7.40 \times 10^4$ | 0.4 | 85 |

Examples 28 to 45, Comparative Example 3 and 4

There was prepared catalyst slurry containing platinum (Pt) as a noble metal and further containing active alumina and ceria as an oxygen adsorbent agent. A coat layer of the catalyst slurry prepared above was formed on the inner surfaces of the partition walls and the inner surfaces of the pores of the honeycomb structures of Examples 1 to 24 and Comparative Examples 1 and 2. Then, the slurry was heat-dried to manufacture honeycomb catalyst bodies (Examples 28 to 45, Comparative Examples 3 and 4) each having the pore structure of the partition walls (with a catalyst layer) shown in Table 3. Incidentally, the amount of the noble metal (Pt) per liter of the honeycomb structure (carrier) was 2 g. In addition, the amount of the catalyst slurry coated per litter of the honeycomb structure (carrier) was 100 g.

TABLE 3

(a)

| | Honeycomb structure | Cell density | | Cell pitch | Partition wall thickness | | Cell hydraulic diameter |
|---|---|---|---|---|---|---|---|
| | | (cells/cm$^2$) | (cpsi) | (mm) | (mm) | (mil) | (m) |
| Example 28 | Example 1 | 12.40 | 80 | 2.84 | 0.508 | 20 | 0.0023 |
| Example 29 | Example 2 | 7.75 | 50 | 3.59 | 0.508 | 20 | 0.0031 |
| Example 30 | Example 3 | 7.75 | 50 | 3.59 | 0.508 | 20 | 0.0031 |
| Example 31 | Example 4 | 12.40 | 80 | 2.84 | 0.508 | 20 | 0.0023 |
| Example 32 | Example 5 | 31.00 | 200 | 1.80 | 0.2032 | 8 | 0.0016 |
| Example 33 | Example 6 | 12.40 | 80 | 2.84 | 0.508 | 20 | 0.0023 |
| Comp. Ex. 3 | Comp. Ex. 1 | 12.40 | 80 | 2.84 | 0.508 | 20 | 0.0023 |
| Example 34 | Example 7 | 12.40 | 80 | 2.84 | 0.508 | 20 | 0.0023 |
| Example 35 | Example 8 | 12.40 | 80 | 2.84 | 0.508 | 20 | 0.0023 |
| Example 36 | Example 9 | 15.50 | 100 | 2.54 | 0.4318 | 17 | 0.0021 |
| Example 37 | Example 10 | 15.50 | 100 | 2.54 | 0.4318 | 17 | 0.0021 |
| Example 38 | Example 11 | 46.50 | 300 | 1.47 | 0.3048 | 12 | 0.0012 |
| Comp. Ex. 4 | Comp. Ex. 2 | 46.50 | 300 | 1.47 | 0.3048 | 12 | 0.0012 |
| Example 39 | Example 12 | 46.50 | 300 | 1.47 | 0.3048 | 12 | 0.0012 |
| Example 40 | Example 13 | 0.25 | 1.61 | 20.02 | 6.985 | 275 | 0.0130 |
| Example 41 | Example 14 | 1.55 | 10 | 8.03 | 1.016 | 40 | 0.0070 |
| Example 42 | Example 15 | 1.55 | 10 | 8.03 | 1.016 | 40 | 0.0070 |
| Example 43 | Example 16 | 1.55 | 10 | 8.03 | 1.016 | 40 | 0.0070 |
| Example 44 | Example 17 | 0.25 | 1.61 | 20.02 | 6.985 | 275 | 0.0130 |
| Example 45 | Example 18 | 0.25 | 1.61 | 20.02 | 6.985 | 275 | 0.0130 |

(b)

| | Average image maximum distance (μm) | Porosity (%) | Permeability (m$^2$) | (Cell hydraulic diameter)$^2$/ Permeability | Pore diameter distribution (σ) | Percentage of the number of carbon particulates passing (%) |
|---|---|---|---|---|---|---|
| Example 28 | 95 | 38 | $3.09 \times 10^{-11}$ | $1.76 \times 10^5$ | 0.3 | 85 |
| Example 29 | 95 | 38 | $3.09 \times 10^{-11}$ | $3.07 \times 10^5$ | 0.3 | 85 |
| Example 30 | 250 | 38 | $2.14 \times 10^{-10}$ | $4.44 \times 10^4$ | 0.3 | 95 |
| Example 31 | 730 | 38 | $1.83 \times 10^{-9}$ | $2.98 \times 10^3$ | 0.3 | 98 |

TABLE 3-continued

| | | | | | | |
|---|---|---|---|---|---|---|
| Example 32 | 90 | 40 | $2.78 \times 10^{-11}$ | $9.14 \times 10^4$ | 0.4 | 83 |
| Example 33 | 800 | 38 | $2.19 \times 10^{-9}$ | $2.48 \times 10^3$ | 0.3 | 98 |
| Comp. Ex. 3 | 44 | 38 | $6.64 \times 10^{-12}$ | $8.19 \times 10^5$ | 0.3 | 58 |
| Example 34 | 280 | 38 | $2.69 \times 10^{-10}$ | $2.02 \times 10^4$ | 0.3 | 95 |
| Example 35 | 480 | 38 | $7.90 \times 10^{-10}$ | $6.88 \times 10^3$ | 0.4 | 98 |
| Example 36 | 48 | 39 | $7.90 \times 10^{-12}$ | $5.63 \times 10^5$ | 0.3 | 82 |
| Example 37 | 380 | 39 | $4.95 \times 10^{-10}$ | $8.98 \times 10^3$ | 0.4 | 95 |
| Example 38 | 48 | 40 | $7.90 \times 10^{-12}$ | $1.71 \times 10^5$ | 0.5 | 82 |
| Comp. Ex. 4 | 23 | 40 | $1.81 \times 10^{-12}$ | $7.44 \times 10^5$ | 0.5 | 20 |
| Example 39 | 440 | 40 | $6.64 \times 10^{-10}$ | $2.03 \times 10^3$ | 0.5 | 94 |
| Example 40 | 445 | 38 | $6.79 \times 10^{-10}$ | $2.50 \times 10^5$ | 0.5 | 93 |
| Example 41 | 195 | 38 | $1.30 \times 10^{-10}$ | $3.78 \times 10^5$ | 0.6 | 92 |
| Example 42 | 150 | 38 | $7.71 \times 10^{-11}$ | $6.38 \times 10^5$ | 0.6 | 95 |
| Example 43 | 140 | 38 | $6.72 \times 10^{-11}$ | $7.33 \times 10^5$ | 0.6 | 83 |
| Example 44 | 235 | 38 | $1.89 \times 10^{-10}$ | $8.97 \times 10^5$ | 0.5 | 85 |
| Example 45 | 4800 | 38 | $7.90 \times 10^{-8}$ | $2.15 \times 10^3$ | 0.5 | 96 |

Examples 46 to 48

There were manufactured honeycomb catalyst bodies (Examples 46 to 48) each having the pore structure of the partition walls (with a catalyst layer) shown in Table 4 in the same manner as in the above Examples 28 to 45 and Comparative Examples 3 and 4 except that a coat layer of catalyst slurry was formed on the inner surface of the partition walls and the inner surface of the pores of the honeycomb structures of Examples 25 to 27. The results of measurement for a percentage of the number of carbon particulates passing are shown in Table 4.

TABLE 4

(a)

| | Honeycomb structure | Mean pore diameter (relative value) | | | Cell density | | Cell pitch | Partition wall thickness | |
|---|---|---|---|---|---|---|---|---|---|
| | | Inlet end portion | Central portion | Outlet end portion | (cells/cm²) | (cpsi) | (mm) | (mm) | (mil) |
| Example 46 | Example 25 | 1 | 1 | 1 | 31.00 | 200 | 1.80 | 0.2032 | 8 |
| Example 47 | Example 26 | 0.75 | 1 | 0.75 | 31.00 | 200 | 1.80 | 0.2032 | 8 |
| Example 48 | Example 27 | 0.5 | 1 | 0.5 | 31.00 | 200 | 1.80 | 0.2032 | 8 |

(b)

| | Cell hydraulic diameter (m) | Average image maximum distance (μm) | Porosity (%) | Permeability (m²) | (Cell hydraulic diameter)²/ Permeability | Pore diameter distribution (σ) | Percentage of the number of carbon particulates passing (%) |
|---|---|---|---|---|---|---|---|
| Example 46 | 0.0016 | 100 | 40 | $3.43 \times 10^{-11}$ | $7.40 \times 10^4$ | 0.4 | 83 |
| Example 47 | 0.0016 | 100 | 40 | $3.43 \times 10^{-11}$ | $7.40 \times 10^4$ | 0.4 | 85 |
| Example 48 | 0.0016 | 100 | 40 | $3.43 \times 10^{-11}$ | $7.40 \times 10^4$ | 0.4 | 85 |

The results of measurement for purification index and rate of increase in pressure loss of the honeycomb catalyst bodies (Examples 28 to 48, Comparative Examples 3 and 4) are shown in Table 5. In addition, the results of evaluation regarding rise in pressure loss and long term clogging resistance are shown in Table 5.

TABLE 5

| | Purification index (%) | Rise in pressure loss | Rate of increase in pressure loss (%) | Long term clogging resistance |
|---|---|---|---|---|
| Example 28 | 200 | None | 7 | Fair |
| Example 29 | 150 | None | 6 | Fair |
| Example 30 | 120 | None | 2 | Good |
| Example 31 | 120 | None | 5 | Good |
| Example 32 | 120 | None | 4.5 | Fair |
| Example 33 | 50 | None | 5 | Good |
| Comp. Ex. 3 | 250 | Present | 20 | Bad |
| Example 34 | 150 | None | 3 | Good |
| Example 35 | 140 | None | 2 | Good |

TABLE 5-continued

|  | Purification index (%) | Rise in pressure loss | Rate of increase in pressure loss (%) | Long term clogging resistance |
|---|---|---|---|---|
| Example 36 | 200 | None | 6 | Fair |
| Example 37 | 170 | None | 3 | Good |
| Example 38 | 300 | None | 7 | Fair |
| Comp. Ex. 4 | 200 | Present | 30 | Bad |
| Example 39 | 40 | None | 7 | Good |
| Example 40 | 150 | None | 8 | Good |
| Example 41 | 200 | None | 3 | Good |
| Example 42 | 180 | None | 2 | Good |
| Example 43 | 250 | None | 30 | Fair |
| Example 44 | 200 | None | 20 | Fair |
| Example 45 | 40 | None | 7.5 | Good |
| Example 46 | 120 | None | 4.5 | Fair |
| Example 47 | 150 | None | 4.5 | Fair |
| Example 48 | 180 | None | 4.5 | Fair |

Examples 49 and 50, Comparative Examples 5 and 6

Honeycomb catalyst bodies (Examples 49 and 50, Comparative Examples 5 and 6) were manufactured in the same manner as in Example 46. The ratio (L/D) of the whole length L of the cells in the direction of communication to the equivalent diameter (D) of each of the honeycomb catalyst bodies manufactured is shown in Table 6.

TABLE 6

(a)

|  | L/D | Cell density (cells/cm$^2$) | (cpsi) | Cell pitch (mm) | Partition wall thickness (mm) | (mil) | Cell hydraulic diameter (m) |
|---|---|---|---|---|---|---|---|
| Examples 49 | 0.7 | 15.5 | 100 | 2.54 | 0.4318 | 17 | 0.0021 |
| Examples 50 | 0.4 | 15.5 | 100 | 2.54 | 0.4318 | 17 | 0.0021 |
| Comp. Ex. 5 | 1 | 15.5 | 100 | 2.54 | 0.4318 | 17 | 0.0021 |
| Comp. Ex. 6 | 0.25 | 15.5 | 100 | 2.54 | 0.4318 | 17 | 0.0021 |

(b)

|  | Average image maximum distance (μm) | Porosity (%) | Permeability (m$^2$) | (Cell hydraulic diameter)$^2$/Permeability | Pore diameter distribution (σ) | Purification index (%) |
|---|---|---|---|---|---|---|
| Example 49 | 290 | 70 | $1.70 \times 10^{-11}$ | $2.59 \times 10^5$ | 0.45 | 230 |
| Example 50 | 290 | 70 | $1.70 \times 10^{-11}$ | $2.59 \times 10^5$ | 0.45 | 230 |
| Comp. Ex. 5 | 290 | 70 | $1.70 \times 10^{-11}$ | $2.59 \times 10^5$ | 0.45 | 150 |
| Comp. Ex. 6 | 290 | 70 | $1.70 \times 10^{-11}$ | $2.59 \times 10^5$ | 0.45 | 170 |

Incidentally, each of the values (mercury pressure, pore diameter (D), and pore volume (f)) used for calculating "σ" of the honeycomb structure of Example 20 is shown in Table 7. In each of Examples and Comparative Examples, "σ" was calculated in the same manner as in Example 20.

TABLE 7

| Mercury pressure (psia) | Pore diameter (D) (μm) | Pore volume (f) (mL/g) | σ (s) |
|---|---|---|---|
| 0.6 | 300 | 0 | 0.279287 |
| 0.65 | 276.5613 | 0.0009 |  |
| 0.96 | 188.5771 | 0.0058 |  |
| 1.25 | 143.8456 | 0.0062 |  |
| 1.54 | 116.8309 | 0.0067 |  |
| 1.96 | 92.236 | 0.0114 |  |
| 2.45 | 73.7034 | 0.0159 |  |
| 3.04 | 59.3331 | 0.0242 |  |
| 3.84 | 46.9749 | 0.0488 |  |
| 4.84 | 37.3198 | 0.1247 |  |
| 6.14 | 29.4055 | 0.1992 |  |
| 7.82 | 23.0717 | 0.1588 |  |
| 9.92 | 18.1951 | 0.0654 |  |
| 12.51 | 14.4223 | 0.0172 |  |
| 15.8 | 11.42 | 0.0031 |  |
| 20.1 | 8.9799 | 0.0006 |  |
| 23.49 | 7.6853 | 0.0002 |  |
| 26.63 | 6.7786 | 0.0002 |  |
| 28.19 | 6.4032 | 0.0001 |  |
| 29.77 | 6.0628 | 0.0001 |  |
| 33.76 | 5.3465 | 0.0001 |  |
| 38.03 | 4.7461 | 0 |  |
| 47.95 | 3.764 | 0 |  |
| 61.36 | 2.9415 | 0 |  |
| 77.49 | 2.3293 | 0 |  |
| 97.71 | 1.8472 | 0 |  |
| 198.36 | 0.9099 | 0 |  |
| 821.77 | 0.2196 | 0 |  |
| 3403.51 | 0.053 | 0.0013 |  |
| 9956.08 | 0.0181 | 0.0104 |  |

DISCUSSION

As shown in Tables 1 to 5, it is clear that each of the honeycomb catalyst bodies of Examples 28 to 45 manufactured by the use of honeycomb structures of Examples 1 to 18 has a high purification index and shows excellent purification performance. In addition, each of the honeycomb catalyst bodies of Examples 28 to 45 has no rise in pressure loss, low rate of increase in pressure loss, and good long term clogging resistance.

INDUSTRIAL APPLICABILITY

A honeycomb catalyst body of the present invention is excellent in purification efficiency, has low pressure loss, and is mountable even in a limited space. Therefore, a honeycomb catalyst body of the present invention can suitably be used for purifying target components contained in exhaust gas discharged from stationary engines for automobiles, construction machines, and industry; combustion apparatuses; and the like.

What is claimed is:

1. A honeycomb structure comprising:
   porous partition walls having a large number of pores and disposed to form a plurality of cells communicating in an axial direction between two end faces of an exhaust gas inflow side and an exhaust gas outflow side; and
   plugged portions disposed to plug each of the cells on one of the end faces, wherein
   a length of each end portion of the honeycomb structure is 30% of a length of the honeycomb structure,
   a length of a central portion of the honeycomb structure between the end portions is 40% of the length of the honeycomb structure,
   both of the end portions and the central portion of the honeycomb structure each include one or more sampling regions, each sampling region including one or more sub-sampling portions, wherein, an average image maximum distance of a sampling region is an average of the largest pore diameters of the sub-sampling portions of the associated sampling region, wherein each sub-sampling region includes one largest pore diameter, wherein average image maximum distances of both of the end portions are less than average maximum distances of the central portion, and a cell hydraulic diameter (m) of the honeycomb structure and a permeability ($m^2$) of the honeycomb structure satisfy a relation of (cell hydraulic diameter)$^2$/(permeability) being $2\times10^3$ or greater, and less than $6\times10^5$,
   the average image maximum distance of the partition walls is 43 μM or more, and
   the average image maximum distance of the cells in both of the end portions in the longitudinal direction is 80% or less of the average image maximum distance of the cells in the central portion in the longitudinal direction.

2. A honeycomb structure according to claim 1, wherein the average image maximum distance of the cells in both of the end portions in the longitudinal direction is 60% or less of the average image maximum distance of the cells in the central portion in the longitudinal direction.

3. A honeycomb structure according to claim 1, wherein a ratio (L/d) of a length (L) of the cells in the direction of communication to the equivalent diameter (D) is 0.3 or more and less than 0.75.

4. A honeycomb structure according to claim 1, wherein a thickness of the partition walls is 0.3 to 0.43 mm, a cell density is 4 to 46.5 cells/cm$^2$, an average image maximum distance of the partition walls is 250 to 500 μm, and a porosity of the partition walls is 55 to 65%.

5. A honeycomb structure according to claim 1, wherein an average image maximum distance of the partition walls is 250 to 3000 μm.

6. A honeycomb catalyst body comprising:
   a honeycomb structure according to claim 1, and
   a catalyst layer containing a catalyst and loaded at least on an inner surface of the pores of the partition walls of the honeycomb structure.

7. A honeycomb catalyst body according to claim 6, wherein an image maximum distance average of the partition walls is 40 μm or more in a state that the catalyst layer is loaded.

8. A honeycomb catalyst body according to claim 6, wherein an average image maximum distance of the partition walls is 40 μm or more in a state that the catalyst layer is loaded, and the average image maximum distance of the cells in both of the end portions in the longitudinal direction is 60% or less of the average image maximum distance of the cells in the central portion in the longitudinal direction.

9. A honeycomb catalyst body according to claim 6, wherein a ratio (L/D) of a length (L) of the cells in the direction of communication to the equivalent diameter (D) is 0.3 or more and less than 0.75, a thickness of the partition walls is 0.3 to 0.43 mm, a cell density is 4 to 46.5 cells/cm$^2$, an average image maximum distance of the partition walls is 250 to 500 μm, a porosity of the partition walls is 60 to 80%, and a common logarithm standard deviation (pore diameter distribution a) of pore diameter distribution in the partition walls is 0.2 to 0.6.

10. A honeycomb structure according to claim 1, wherein, when a combustion exhaust gas satisfying the following condition (1) passes through the honeycomb structure, a percentage of the number of carbon particulates contained in the combustion exhaust gas after passing remains 80% or more at a space velocity of 25000/h,
   Condition (1): the carbon particulates has a mean diameter of 0.07 to 0.2 μm, a ratio of the carbon particulates having a diameter of 1 μm or more is 0.1% or less in number, and a concentration of the carbon particulates is 10 mg/m$^3$.

* * * * *